(12) United States Patent
Park et al.

(10) Patent No.: US 8,094,306 B2
(45) Date of Patent: Jan. 10, 2012

(54) MICRO RING GRATING SPECTROMETER WITH ADJUSTABLE APERTURE

(75) Inventors: Yeonjoon Park, Yorktown, VA (US);
Glen C. King, Williamsburg, VA (US);
James R. Elliott, Vesuvius, VA (US);
Sang H. Choi, Poquoson, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 434 days.

(21) Appl. No.: 12/487,735

(22) Filed: Jun. 19, 2009

(65) Prior Publication Data

US 2010/0039641 A1    Feb. 18, 2010

Related U.S. Application Data

(60) Provisional application No. 61/089,261, filed on Aug. 15, 2008.

(51) Int. Cl.
*G01J 3/28* (2006.01)
(52) U.S. Cl. ........................................................ 356/328
(58) Field of Classification Search .................. 356/328, 356/334
See application file for complete search history.

(56) References Cited

U.S. PATENT DOCUMENTS

| | | | |
|---|---|---|---|
| 3,107,270 A | 10/1963 | Hildebrand | |
| 3,343,448 A * | 9/1967 | Baird | 356/326 |
| 3,454,338 A | 7/1969 | Girard et al. | |
| 4,429,411 A | 1/1984 | Smither | |
| 4,733,943 A * | 3/1988 | Suzuki et al. | 359/569 |
| 4,743,083 A | 5/1988 | Schimpe | |
| 4,752,130 A | 6/1988 | George et al. | |
| 5,011,284 A | 4/1991 | Tedesco et al. | |
| 5,165,063 A * | 11/1992 | Strater et al. | 356/4.01 |
| 5,204,516 A | 4/1993 | Opheij | |
| 5,357,591 A | 10/1994 | Jiang et al. | |
| 5,731,874 A | 3/1998 | Maluf | |
| 5,793,488 A | 8/1998 | Kulawiec et al. | |
| 5,986,758 A | 11/1999 | Lyons et al. | |
| 5,995,221 A | 11/1999 | Slutter et al. | |
| 6,226,083 B1 | 5/2001 | Schwerzel et al. | |
| 6,335,625 B1 | 1/2002 | Bryant et al. | |
| 6,452,675 B1 | 9/2002 | Muller et al. | |
| 6,509,559 B1 | 1/2003 | Ulrich et al. | |
| 6,518,555 B1 | 2/2003 | Kikuchi et al. | |
| 6,583,873 B1 | 6/2003 | Goncharov et al. | |
| 6,597,452 B1 | 7/2003 | Jiang et al. | |
| 6,643,065 B1 | 11/2003 | Silberman | |

(Continued)

*Primary Examiner* — Kara E Geisel
(74) *Attorney, Agent, or Firm* — Thomas K. McBride, Jr.; Linda B. Blackburn

(57) ABSTRACT

A spectrometer includes a micro-ring grating device having coaxially-aligned ring gratings for diffracting incident light onto a target focal point, a detection device for detecting light intensity, one or more actuators, and an adjustable aperture device defining a circular aperture. The aperture circumscribes a target focal point, and directs a light to the detection device. The aperture device is selectively adjustable using the actuators to select a portion of a frequency band for transmission to the detection device. A method of detecting intensity of a selected band of incident light includes directing incident light onto coaxially-aligned ring gratings of a micro-ring grating device, and diffracting the selected band onto a target focal point using the ring gratings. The method includes using an actuator to adjust an aperture device and pass a selected portion of the frequency band to a detection device for measuring the intensity of the selected portion.

17 Claims, 3 Drawing Sheets

U.S. PATENT DOCUMENTS

| | | |
|---|---|---|
| 6,762,839 B2 | 7/2004 | Zeylikovich et al. |
| 6,847,447 B2 | 1/2005 | Ozanich |
| 6,995,840 B2 | 2/2006 | Hagler |
| 6,999,165 B2 | 2/2006 | Hagler |
| 7,084,972 B2 | 8/2006 | Treado |
| 7,158,228 B2 | 1/2007 | Psaltis et al. |
| 7,161,673 B2 | 1/2007 | Da Silva |
| 7,196,791 B2 | 3/2007 | Johansen et al. |
| 7,253,958 B2 | 8/2007 | Aizenberg et al. |
| 7,262,917 B2 | 8/2007 | Yang et al. |
| 2004/0032585 A1 | 2/2004 | Johansen et al. |
| 2007/0139792 A1* | 6/2007 | Sayag ............... 359/739 |
| 2007/0165221 A1 | 7/2007 | Deck et al. |
| 2008/0094631 A1 | 4/2008 | Jung et al. |
| 2008/0119060 A1 | 5/2008 | Goodwin et al. |
| 2010/0039643 A1* | 2/2010 | Park et al. ............ 356/328 |
| 2010/0039644 A1* | 2/2010 | Choi et al. ............ 356/328 |

\* cited by examiner

MICRO RING GRATING SPECTROMETER WITH ADJUSTABLE APERTURE

CROSS-REFERENCE TO RELATED APPLICATIONS

This application claims priority to and the benefit of U.S. Provisional Application 61/089,261 filed on Aug. 15, 2008, which is hereby incorporated by reference in its entirety.

ORIGIN OF THE INVENTION

The invention described herein was made by employees of the United States Government and may be manufactured and used by or for the Government for governmental purposes without payment of any royalties thereon or therefor.

TECHNICAL FIELD

The present invention relates generally to spectrometers, and in particular to spectrometers having circular or ring-shaped gratings and an adjustable aperture.

BACKGROUND OF THE INVENTION

The field of spectroscopic analysis or spectroscopy pertains to the study of the dispersion of light into different colors based on the component wavelengths of the light. By analyzing the absorption and dispersion of incident light and other radiation by matter, scientists are able to study various properties of the matter such as temperature, mass, luminosity, composition, etc. Optical instruments known as spectrometers are used to measure and study such light dispersion, and play an essential role in the study and design of various scientific monitoring devices, for example multi-spectral imaging (MSI) systems, hyper-spectral imaging (HSI) systems, and the like.

In a conventional spectrometer, incident light passes through a first linear opening or slit in a first mirror or optical lens. A beam of incident light passing through the slit illuminates a prism or a linear grating device. The grating device may have a series of vertically-aligned linear gratings which diffract the incident light into its component colors, with each color corresponding to a particular frequency band of the electromagnetic spectrum.

Spectrometers may include multiple slits, with the first slit positioned in front of the linear grating device to initially select light in a relatively narrow frequency band. The linear grating device spreads this portion of the light beam at different wavelength-dependent angles. A second slit in another mirror or lens may be positioned in front of a photon detection device to allow selective passage of a narrower band of the incoming light beam from the linear grating device. In this manner, a specific wavelength or set of wavelengths may be selected for spectral analysis. The photon detection device detects the intensity of light of the specific wavelengths. In some spectrometer systems the linear grating device may be rotated to receive and diffract light of different wavelengths. The photon detection device then transits an electrical signal describing the intensity of the detected light to a recorder which records the signal at the predetermined wavelengths.

In certain conventional spectrometer designs the second slit and the photon detection device described above may be replaced with a multi-channel position-sensitive device such as a Charged Coupled Detector (CCD) array. As noted above, conventional spectrometers typically use linear gratings in conjunction with linear aperture slits, and thus an additional dimension is ordinarily required to effectively spread the incident light beam. Position-sensitive detectors such as CCD arrays may eliminate the need for a linear aperture slit, but nevertheless may require the additional dimension in order to function properly. The added dimension may result in a relatively bulky spectrometer design, with the lower size limit of a typical spectrometer being on the order of a few centimeters.

SUMMARY OF THE INVENTION

Accordingly, a spectrometer is provided herein that includes a series of coaxially-aligned annular or micro-ring gratings rather than the conventional linear gratings described above. The spectrometer also includes an adjustable aperture device having a circular opening or aperture rather than a linear slit of conventional spectrometer designs. As a result, the spectrometer of the present invention may be miniaturized to provide significant size advantages relative to the spectrometer devices of the prior art.

Within the scope of the invention, the micro-ring gratings are concentrically aligned with respect to a common optical axis of the spectrometer. The micro-rings have a calibrated gap width between adjacent rings, and have a calibrated ring size or width. The micro-ring gratings are used to generate a particular grating or dispersion effect on incident light, thus directing a portion of the incident light onto a target optical focal point. An opaque surface such as a metallic disk or other suitably opaque member may be positioned at the center of the concentric micro-ring gratings in order to substantially block a zero-order direct beam, as that term is properly understood in the art.

Outer micro-ring gratings diffract the incident light beam according to the beam's wavelength, and focus beams of selected wavelengths at different focal points along the optical axis of the spectrometer. The circular aperture passes a portion of a selected wavelength or frequency band of the incident light beam to a detection device, which in turn detects desired spectral characteristics of the selected portion, e.g., intensity. The detected intensities or other characteristics may be recorded for later spectral analysis. By changing the distance between the micro-ring gratings and the aperture device, such as by moving the aperture device closer to or farther away from the grating device using a linear actuator, various wavelengths may be scanned to obtain the desired spectral information.

In particular, a spectrometer includes a micro-ring grating device having a plurality of coaxially-aligned ring gratings. The grating device diffracts a predetermined frequency band of incident light onto a target focal point. The spectrometer includes a detection device operable for detecting a predetermined spectral characteristic, e.g., intensity, at least one actuator, and an adjustable aperture device. The aperture device defines a circular aperture circumscribing the target focal point, with the aperture device being operable for directing a selected portion of the predetermined frequency band to the detection device. The aperture device is selectively adjustable using one or more of the actuators to thereby select the portion of the predetermined frequency band for transmission to the detection device. A linear actuator may be connected to the aperture device and configured for selectively adjusting the focal length between the grating device and the aperture device. Another actuator may be used for changing the diameter of the circular aperture. An opaque member may be positioned along an optical axis of the spectrometer and configured for blocking a zero-order direct beam.

A method is also provided for detecting the intensity of a selected frequency band of incident light. The method includes directing the incident light onto a plurality of coaxially-aligned ring gratings of a micro-ring grating device, and then diffracting a predetermined frequency band of the incident light onto a target focal point using the ring ratings. The method also includes using at least one actuator to selectively adjust an adjustable aperture device to thereby pass a selected portion of the frequency band to a detection device, and then detecting the intensity of the selected portion using the detection device.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
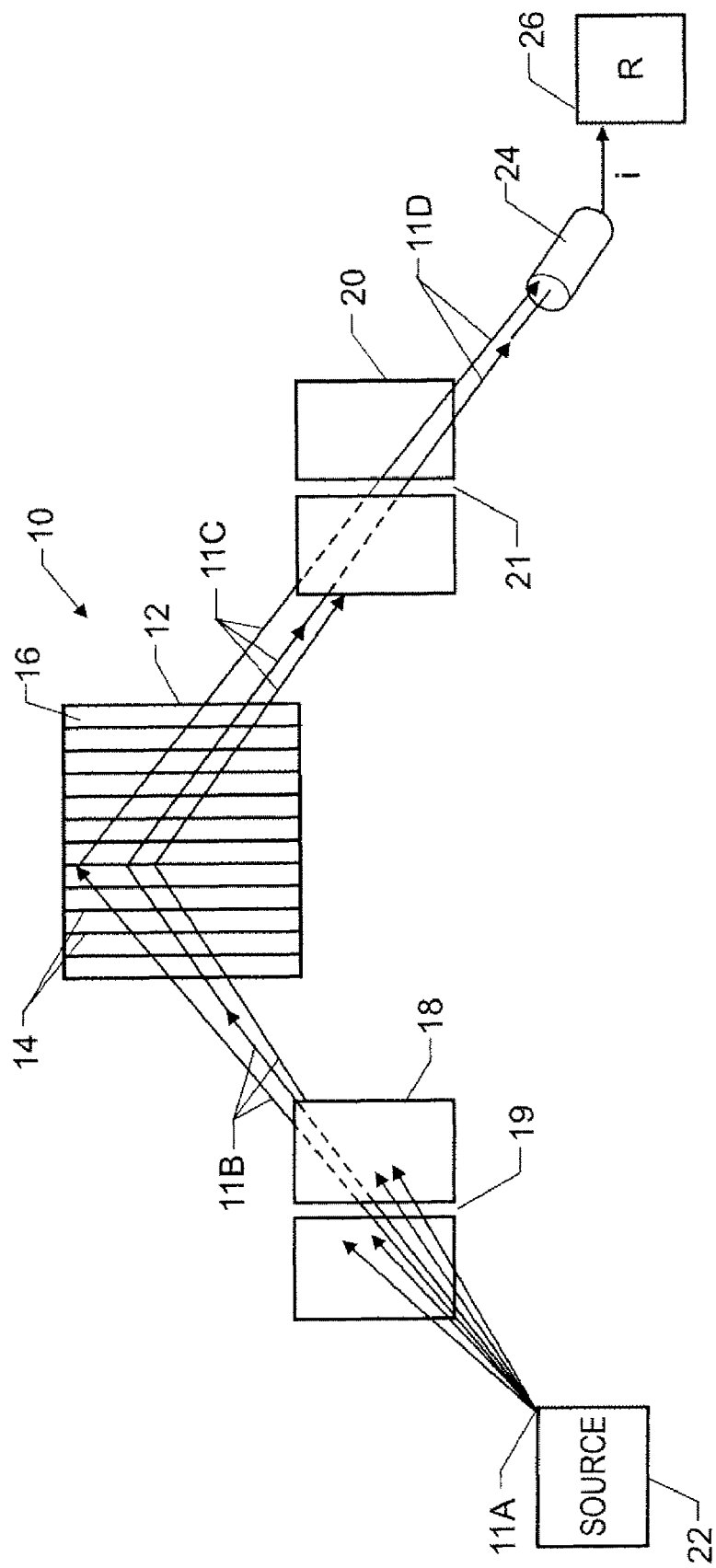
FIG. 1 is a schematic prior art illustration of a conventional spectrometer having linear gratings and a linear aperture slit.

Referring to the drawings wherein like reference numbers represent like components throughout the several figures, and beginning with FIG. 1, a conventional spectrometer 10 may include a linear grating device 12 having a series of linear gratings 14 suitable for diffracting incident light (arrows 11B) as noted above. As will be understood by those of ordinary skill in the art of optics, the term "grating" refers to an optical element configured for diffracting incident light. Gratings have a regular pattern which splits and diffracts incident light into several beams travelling in directions that depend on the spacing between gratings and the wavelength of the incident light. The spectrometer 10 may include vertically-aligned mirrors 16 defining the linear gratings 14. Additionally, the spectrometer 10 may include a pair of lenses or mirrors 18 and 20 each defining respective first and second linear apertures or slits 19 and 21.

Source light (arrows 11A) is directed toward the mirror 18 from a source 22, e.g., an object, organism, matter, or other substance serving as the subject of the spectral analysis at hand. The source light passes from the source 22 through the slit 19 in mirror 18. A portion of the source light (arrows 11A) is directed toward the grating device 12 as the incident light (arrows 11B). The linear gratings 14 diffract the incident light (arrows 11B) passing through slit 19 at different angles according to the particular wavelength of the incident light. The diffracted light (arrows 11C) passes in turn through the slit 21 in mirror 20. A selected portion (arrows 11D) of the diffracted light (arrows 11C) is directed toward a detection device 24, e.g., a photon detector or other suitable detection device capable of determining a desired spectral characteristic, e.g., the intensity of the selected light (arrows 11D).

As noted above, the slit 19 in mirror 18 enables passage of a selected band of the original source light (arrows 11A). The detection device 24, which is typically but not necessarily configured as a photon detector, may be positioned adjacent to the slit 21 to receive photons of a particular wavelength. After detection, the linear grating device 12 may be rotated as needed to receive different wavelengths of the incident light (arrows 11B). Also after detection, the detection device 24 may transmit an electrical signal (arrow i) such as a proportional voltage level or other suitable signal to a recording device 26, e.g., a data logger or other computer device configured for recording the required information. Thereafter, the recorder 26 may be used to record the desired spectral characteristic of the selected light (arrows 11D).

As noted above, in some conventional spectrometers the slit 19 and the detection device 24 may be replaced with a multi-channel position sensitive detector (not shown), e.g., a Charged Coupled Detector (CCD) array. Such spectrometers typically require additional space to direct the incident light (arrows 11B) according to its wavelength(s), and therefore the lower limit of the size of the conventional spectrometer 10 of FIG. 1 may be limited to a few centimeters due to the extra length required for a CCD and/or the rotation of the linear grating device 12.

Figure 2:
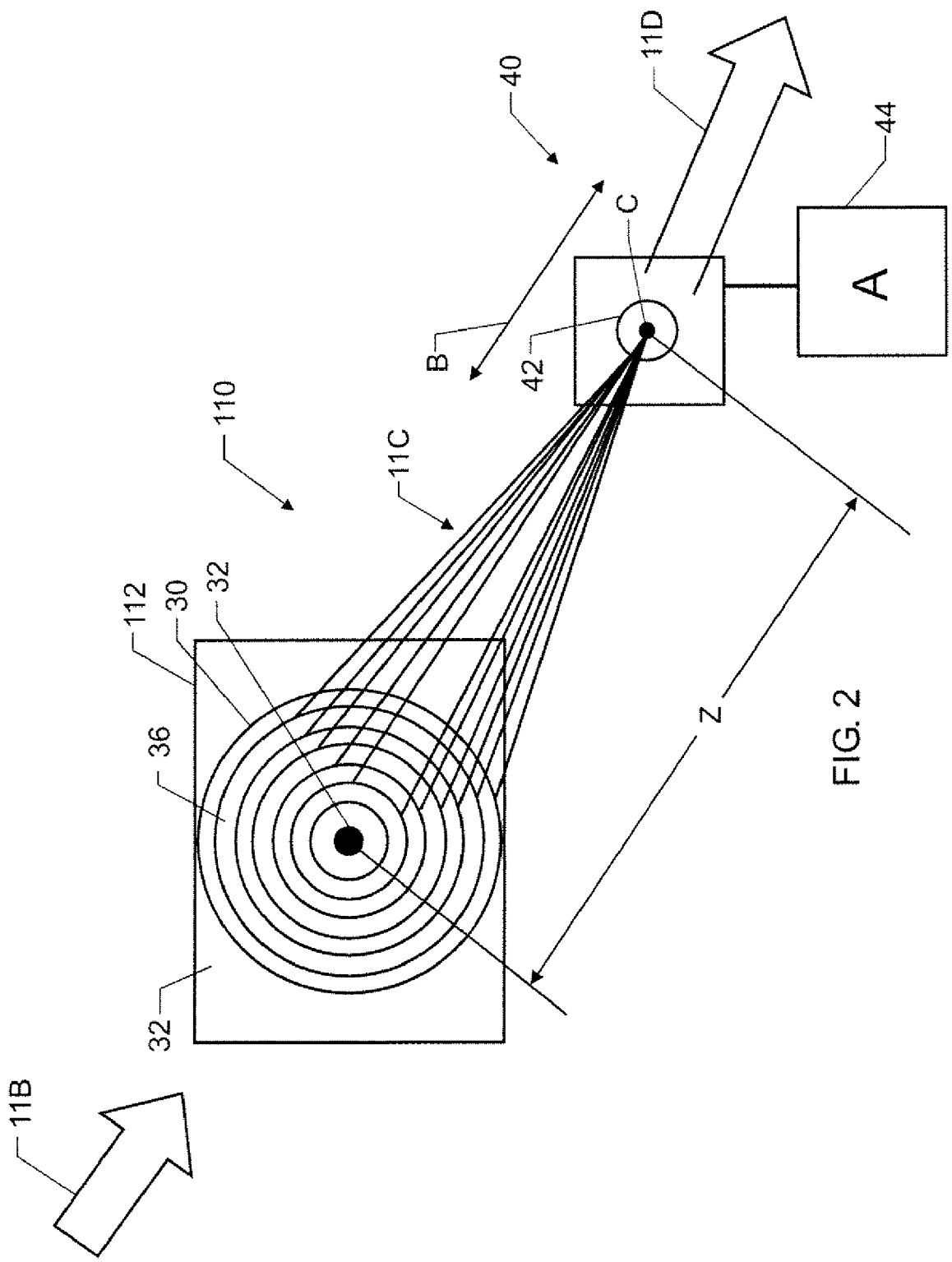
FIG. 2 is a schematic illustration of a spectrometer having concentric micro-ring gratings and an adjustable aperture device in accordance with an embodiment of the present invention.

Referring to FIG. 2, a spectrometer 110 constructed in accordance with the present invention includes a micro-ring grating device 112 having annular binary gratings or refractive micro-rings 30 interposed with a series of opaque micro-rings 36. The grating device 112 may also include an opaque center area 32 and an adjustable aperture device 40. A portion of the incident light (arrows 11B of FIG. 2) reaches and passes through the grating device 112 as the diffracted light (arrows 11C). The diffracted light (arrows 11C) passing through the grating device 12 is thus directed onto a target focal point C.

Figure 3:
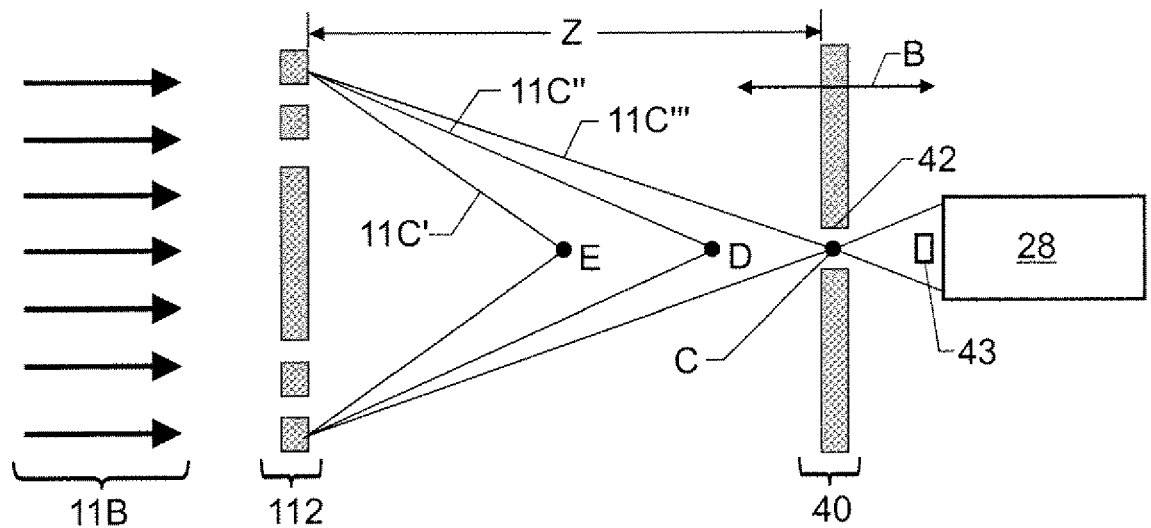
FIG. 3 is schematic illustration of wavelength selection using the spectrometer shown in FIG. 2.

The adjustable aperture device 40 defines a circular opening or aperture 42 circumscribing the focal point C, or mother focal point depending on the position of the aperture device 40. That is, the focal point C may differ with other specified wavelengths of light to provide alternate focal points, e.g., the focal points D or E as shown in FIG. 3 and described below. Opaque center area 32 is configured to substantially block transmission of the incident light (arrows 11B) through the grating device 112 as noted above. The opaque center area 32 may be configured as, for example, one or more opaque circular discs or other suitable light blocking structure. The center area 32 may be constructed of a suitable metallic material, e.g., gold, aluminum, silver, and/or a combination thereof, or of any other suitable opaque material.

The aperture device 40 may be selectively adjusted within the scope of the invention. As used herein, the term "adjusted" refers to one or more features or dimensions of the aperture device 40 being variable, e.g., the position of the aperture device 40 with respect to the grating device 112, the diameter of the aperture 42, etc. The aperture device 40 may be placed a focal length Z away from the grating device 112. The aperture device 40 allows passage of selected light (arrow 11D) of a selected wavelength through the aperture 42 while simultaneously blocking light of other non-selected wavelengths.

The position of the aperture device 40 and the distance between the grating device 112 and the aperture 42 may be varied using one or more linear actuators (A) 44, e.g., piezoelectric actuators, micro-motors, MEMS (Micro-Electro-Mechanical Systems) linear drivers, and/or other suitable linear translators, to name just a few. Also, by moving the aperture device 40 into the direction of light propagation as indicated by double-sided arrow B in FIG. 2, one may choose the specific wavelength of the diffracted light (arrows 11C) which may pass through the aperture 42.

The light which passes through the aperture 42 is nearly monochromatic with a narrow wavelength distribution or Δλ. The detection device 28 (see FIG. 3) positioned adjacent to the aperture 42 converts the intensity of the selected light (arrows 11D) into a proportional voltage or other suitable electric signals suitable for receipt and processing by a recording device (R) 26 shown in the prior art FIG. 1. Therefore, full spectral information may be obtained by recording the intensity of the selected light (arrows 11D) passing through the aperture 42. As will be discussed below with reference to FIG. 3, another opaque structure 43 such as but not limited to an opaque disc may be positioned between the aperture 42 and the detection device 28 (see FIG. 3) to block any stray light emitted by photons of a slightly different wavelength than those of the non-selected wavelengths.

Referring to FIG. 3 in conjunction with FIG. 2, wavelength selection may be achieved using the micro-ring grating device 112 and the aperture device 40 of the present invention as described above. The incident light (arrows 11B) passing through the grating device 112 for a given focal length Z passes through aperture 42 and is detected by the detection device 28. In order to detect other wavelengths, one may either move the grating device 112 closer to the aperture device 40 so that alternate focal points D or E are located within the aperture 42, i.e., circumscribed by the aperture 42, or one may move the aperture device 40 closer to the grating device 112 to accomplish the same result.

It should be appreciated that a portion of the incident light (arrows 11B), e.g., from a telescope or a microscope, passes through the circular binary or refractive micro-rings 30 of the grating device 112 as shown in FIG. 2. Another portion of the incident light is stopped or reflected away by the opaque micro-rings 36. The center area 32 may be configured as an opaque disc according to one embodiment so that formation of a zero-order direct beam is prevented, as that term is properly understood in the art. The size of the center area 32 and each of the micro-rings 30 and 36 may be used to control the focal point of the diffracted light (arrows 11C) of a selected wavelength. The focal point is located a distance Z from the center of the micro-ring grating device 112, with the value of Z determined by the wavelength of the diffracted light (arrows 11C).

If one of the micro-rings of the grating device 112 is in a negative zone plate in a negative zone plate design, as those terms are understood in the art, the radius of the opaque micro-rings 36 may be determined using the following equation:

$$r_n = K\sqrt{n}$$

, where n is between 0~1, 2~3, 4~5, etc., and where the constructive focal points are:

$$Z = \frac{K^2}{\lambda}, \frac{K^2}{3\lambda}; \frac{K^2}{5\lambda}, \text{etc.}$$

It should be appreciated that focal point is inversely proportional to wavelength (λ), and that a negative zone plate is just one example of circular ring gratings. A fractal zone plate may also be used as the required circular ring grating. Different ring grating designs are also possible as long as the focal point distance Z changes significantly with the wavelength of the diffracted light (arrows 11C). Because a zero-order direct-beam is blocked by the center area 32, and because each wavelength (λ) has a different focal point, the detection device 28 receives photons of selected wavelengths, i.e., the diffracted light (arrows 11C), which are determined by the value of Z between the grating device 112 and the aperture 42.

Still referring to FIG. 3 in conjunction with FIG. 2, since the spectrometer 110 in its entirety is configured in the line of light propagation the spectrometer 110 does not require additional dimensions to properly spread the incident light beam (arrows 11B) of FIG. 2. Furthermore, within the scope of the present invention rotation of the grating device 112 is not required. As a result, the spectrometer 110 may be miniaturized from between approximately a few micrometers and approximately a few millimeters.

The various micro-rings of the micro-ring grating device 112 may be fabricated with different sizes. Electron-beam lithography, nano-imprint lithography, a focused ion beam, or other suitable methods may be used to fabricate rings from a metallic layer, e.g., Ag (silver), Au (gold), Al (aluminum), and/or combinations and compounds thereof, on glass and double side-polished sapphire disc. The rings may be fabricated with e-beam lithography, with an overall size of approximately 150 micrometers (μ) diameter and approximately 720μ diameter according to one embodiment. The aperture 42 may be fabricated with an E-beam lithography having a width of approximately 20μ in another embodiment.

An improved aperture may be built by positioning the opaque structure 43, for example an opaque disk as noted above, between the aperture 42 and the detection device 28 in order to block central stray-lights from the photons of slightly different wavelengths or the non-selected wavelengths. Also, the diameter of the aperture 42 may be varied and optimized using a MEMS structure, e.g., by using at least one Micro-Electro-Mechanical System or MEMS device 140 as shown in FIG. 4 and discussed below.

Figure 4:
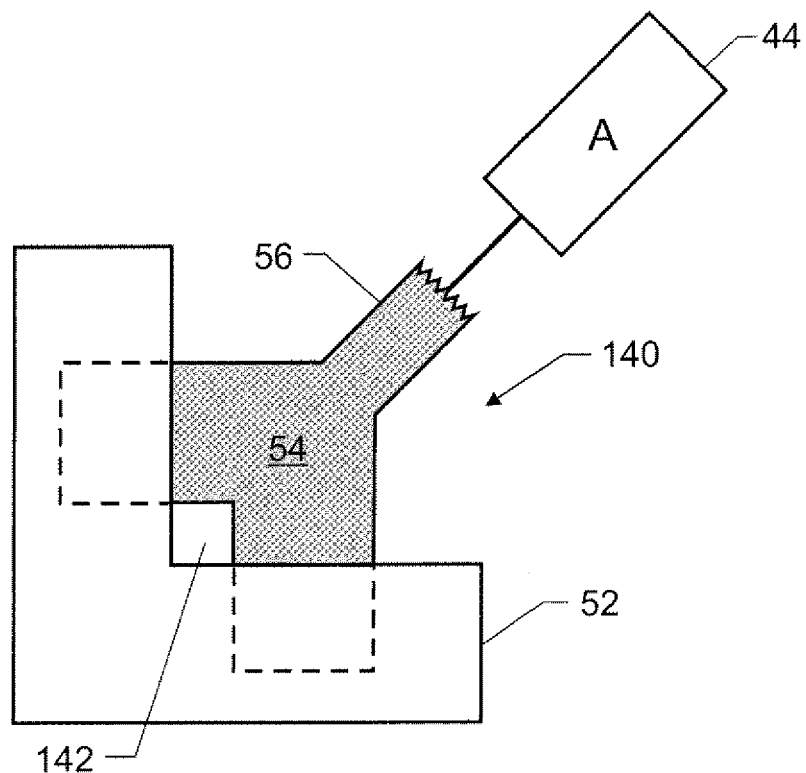
FIG. 4 is a schematic illustration of an actuator that is usable with the spectrometer of FIG. 2 for providing a variable aperture size according to another embodiment of the present invention.

Referring to FIG. 4, the MEMS device 140 according to one embodiment may have a first fixed or movable component 52 which overlaps with a second movable component 54. The components 52 and 54 are both structurally connected to at least one motion driving component 56. For example, driving component 56 may be connected to the second component 54 such that a variable aperture 142 is enabled. An actuator (A) 44 may move the driving component 56 to affect the required diametric change in the aperture 142.

It should be appreciated that the size and shape of the aperture 142 is controlled by the component 56. Proper selection of the size of the aperture 42 of FIGS. 2 and 3 or the variable aperture 142 shown in FIG. 4 ensures balance of the spectral resolution and collected photon intensity. While a circular shape for the apertures 42, 142 is set forth above, those of ordinary skill in the art will appreciate that apertures of any appropriate size or shape may also be used without departing from the intended scope of the invention. For simplicity a single spectrometer 110 is shown in FIGS. 2 and 3. However, one of ordinary skill in the art may construct an array of such spectrometers 110, or of any of the components thereof, e.g., for multi-spectral and hyper-spectral imaging, without departing from the intended scope of the invention.

Furthermore, because the dimension of the spectrometer 110 can be relatively small, and because the grating device 112, apertures 42, 142, and detection device 28 are located in the line of light propagation, one may use multiple spectrometers 110 for hyper-spectral imaging (HSI) to build a 3-D data cube of 2-D images at multiple wavelengths.

For optical properties of a micro-ring grating of approximately 720μ overall size, for example, a PSF' (Point-Spread-Function) at focal point Z may be calculated in order to estimate the focus size for the selected light 11D (see FIGS. 2 and 3). This simulation may be made with green light of wavelength 532 nm at the focal point Z=12.1 mm, which optimized for a 530 nm wavelength. Most of the PSI' may be confined within a diameter of approximately 20μ. In order to find the spectral resolution, a PSI' may be calculated at multiple focal points, with different wavelengths as shown in FIGS. 2 and 3. For example, Spectral Resolution (Δλ) of Full-Width-Half-Maximum may be obtained at different focal points for red light (633 nm), green light (532 nm) and deep blue light (405 nm).

The following examples are provided to further illustrate the invention, and are not intended to be limiting thereof.

EXAMPLE 1

The PSI' (Point-Spread-Function) of different wavelengths may be obtained from about 590 nm to about 680 nm at a focal point Z=10.2 mm, optimized for the red color, i.e., λ=633 nm. The PSI' may be maximized at approximately 633 nm and decreases as the wavelength varies from approximately 633 nm. Full-Width-Half-Maximum (FWHM) Δλ is approximately 30 nm for a red focal point in this example.

EXAMPLE 2

The PSF of different wavelengths may be obtained from approximately 497 nm to about 572 nm at a focal point Z=12.1 mm optimized for the green color, i.e., λ=532 nm. The PSF may be maximized at approximately 532 nm and decreases as the wavelength varies from approximately 532 nm. FWHM Δλ is approximately 25 nm for a green focal point in this example.

EXAMPLE 3

The PSF of different wavelengths may be obtained from approximately 375 nm to approximately 435 nm at a focal point Z=115.9 mm optimized for deep blue color, i.e., λ=405 nm. The PSF may be maximized at approximately 405 nm and decreases as the wavelength varies from approximately 405 nm. FWHM (Δλ) is approximately 20 nm for a deep blue focal point in this example.

While the best modes for carrying out the invention have been described in detail, those familiar with the art to which this invention relates will recognize various alternative designs and embodiments for practicing the invention within the scope of the appended claims.

The invention claimed is:

1. A spectrometer comprising:
a micro-ring grating device having a plurality of coaxially-aligned ring gratings, wherein the grating device is configured for diffracting a predetermined frequency band of incident light onto a target focal point;
a detection device operable for detecting a predetermined spectral characteristic;
at least one actuator; and
an adjustable aperture device defining a circular aperture circumscribing the target focal point, wherein the aperture device is operable for directing a selected portion of the predetermined frequency band to the detection device;
wherein the adjustable aperture device is selectively adjustable using the at least one actuator to thereby direct the selected portion of the predetermined frequency band to the detection device.

2. The spectrometer of claim 1, wherein a focal length is defined as the distance between the aperture device and the micro-ring grating device, and wherein a linear actuator is connected to the aperture device and configured for selectively adjusting the focal length.

3. The spectrometer of claim 2, wherein the at least one actuator includes a first actuator for changing a diameter of the circular aperture, and a second actuator for changing the focal length between the grating device and the aperture device.

4. The spectrometer of claim 1, further comprising an opaque member positioned along an optical axis of the spectrometer and configured for blocking a zero-order direct beam.

5. The spectrometer of claim 1, wherein the grating device is constructed at least partially of glass and a double-side-polished sapphire disc.

6. The spectrometer of claim 1, wherein the gratings include alternating refractive rings and opaque rings.

7. The spectrometer of claim 1, further comprising a recording device in communication with the detection device, wherein the recording device is configured for recording an electrical signal from the detection device that defines the predetermined spectral characteristic.

8. A spectrometer comprising:
a micro-ring grating device having a plurality of coaxially-aligned ring gratings, wherein the ring gratings are configured for directing a predetermined frequency band of incident light onto a target focal point;
an adjustable aperture device defining a circular aperture circumscribing the target focal point;
a detection device adapted for detecting the intensity of a selected portion of the predetermined frequency band, and for converting the detected intensity into a corresponding proportional electrical signal;
a linear actuator connected to the aperture device, wherein the linear actuator is configured for selectively changing the distance between the aperture device and the grating device to thereby modify the focal length of the spectrometer; and
a Micro-Electro-Mechanical System (MEMS) device connected to the aperture device and configured for changing the diameter of the circular aperture.

9. The spectrometer of claim 8, further comprising an opaque member positioned on the axis of the coaxially-aligned circular gratings, the opaque member being configured for blocking stray-light from photons of non-selected wavelengths.

10. The spectrometer of claim 8, wherein the gratings include alternating opaque rings and transparent rings each having a calibrated width suitable for focusing the predetermined frequency band onto the focal point.

11. The spectrometer of claim 8, wherein at least some of the gratings are constructed of a metallic layer on a glass and double-side-polished sapphire disc.

12. The spectrometer of claim 8, further comprising a recording device in communication with the detection device, wherein the recording device is configured for recording the proportional electrical signal.

13. A method of detecting the intensity of a selected frequency band of incident light, the method comprising:
directing the incident light onto a plurality of coaxially-aligned ring gratings of a micro-ring grating device;
diffracting a predetermined frequency band of the incident light onto a target focal point using the ring gratings;
using at least one actuator to selectively adjust an adjustable aperture device to thereby pass a selected portion of the frequency band to a detection device;
detecting the intensity of the selected portion using the detection device.

14. The method of claim 13, including a recording device, further comprising:
using the recording device to record the detected intensity.

15. The method of claim 14, wherein the at least one actuator includes a Micro-Electro-Mechanical System (MEMS) device that is operatively connected to the aperture device, and using at least one actuator to selectively adjust an aperture device includes activating the MEMS device to thereby change the diameter of the circular aperture.

16. The method of claim 14, wherein the at least one actuator includes a linear actuator that is operatively connected to the aperture device, and wherein using at least one actuator to selectively adjust an aperture device includes activating the linear actuator to thereby change the distance between the grating device and the aperture device.

17. The method of claim 14, further comprising positioning an opaque disc positioned at the center of the ring gratings, wherein diffracting a predetermined frequency band of the incident light onto a target focal point using the ring gratings includes substantially blocking zero-order direct beam using the opaque disc.

* * * * *